United States Patent [19]

Moss

[11] Patent Number: 5,044,822
[45] Date of Patent: Sep. 3, 1991

[54] OPEN BOTTOM PIT SEAL

[75] Inventor: Kathyleen D. Moss, Garden Grove, Calif.

[73] Assignee: Kathyleen A. Dabic, as Trustee & Her Successor Under Trust Agreement for Kathyleen A. Dabic Moss, dated Jan. 26, 1990, Fountain Valley, Calif.

[21] Appl. No.: 482,153

[22] Filed: Feb. 20, 1990

[51] Int. Cl.⁵ .................... B65B 3/06; E02D 29/14
[52] U.S. Cl. ........................... 405/52; 405/133; 404/25; 210/165; 52/20
[58] Field of Search ............... 405/52, 53, 151, 150, 405/132, 303; 52/20; 277/2, 3; 141/86; 404/25, 26

[56] References Cited

U.S. PATENT DOCUMENTS

| | | |
|---|---|---|
| 1,721,308 | 7/1929 | Lormor . |
| 3,106,099 | 10/1963 | Jeffrey et al. ............ 277/3 |
| 3,141,685 | 7/1964 | Watts ...................... 277/3 |
| 3,220,433 | 11/1965 | Speil . |
| 3,488,965 | 1/1970 | Chesnor ................. 405/151 |
| 4,278,115 | 7/1981 | Briles et al. ............ 52/20 |
| 4,302,126 | 11/1981 | Fier ..................... 405/142 X |
| 4,305,679 | 12/1981 | Modi .................... 52/20 X |
| 4,557,625 | 12/1985 | Jahnke et al. .......... 52/20 X |
| 4,593,714 | 6/1986 | Madden . |
| 4,600,114 | 7/1986 | Dabich . |
| 4,659,251 | 4/1987 | Petter et al. ............ 52/20 |
| 4,850,389 | 7/1989 | Moss ................... 277/3 X |

OTHER PUBLICATIONS

Catalog pages F-1.0 and F-2.0 published by Culligan & McCallum, Inc., dated 1-1-81.
Catalog page Inst. 3-0 published by Culligan & McCallum, Inc. dated 1-1-81.

Primary Examiner—Dennis L. Taylor
Attorney, Agent, or Firm—Charles H. Thomas

[57] ABSTRACT

A sealing system is provided for a prefabricated pit for servicing an aircraft that is formed with an open bottom and an inner cylindrical wall for surrounding a riser pipe therewithin. An annular rubber boot having annular inner and outer marginal edges is located at the bottom of the pit. The inner peripheral margin of the boot is secured to the riser pipe by a conventional metal band clamp to establish a liquid tight seal therewith, and the outer peripheral margin of the boot is compressed radially outwardly against the cylindrical wall surface by means of an outer clamp. The outer clamp is comprised of a length of metal stock formed into a loop having opposite ends, loop extension means attached to one of the opposite ends to receive the other end therewithin in overlapping fashion, and an expansion system attached to the ends of the loop for selectively and adjustably spreading the loop radially outwardly to thereby clamp the peripheral margin of the boot in a liquid tight seal against the cylindrical wall of the pit.

7 Claims, 2 Drawing Sheets

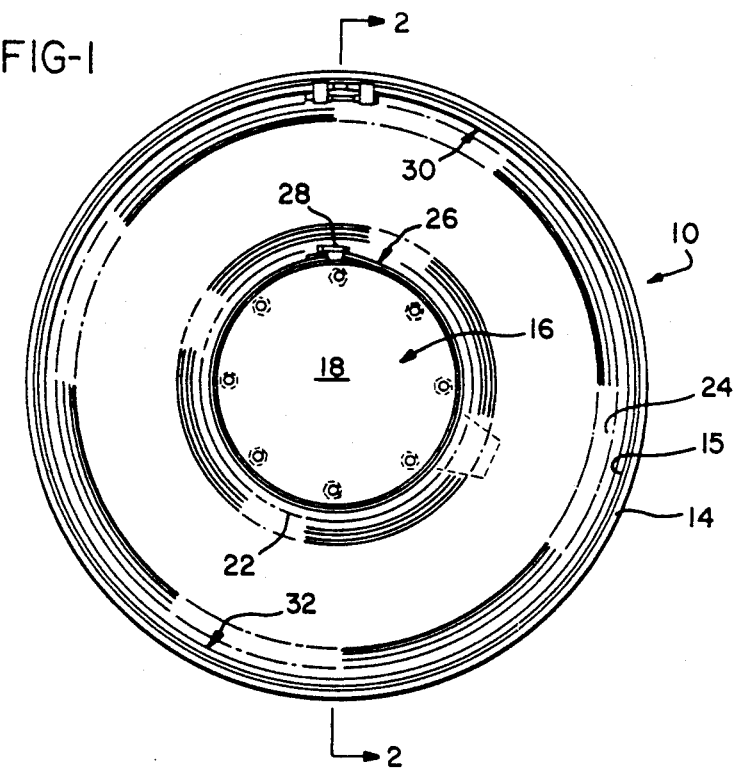
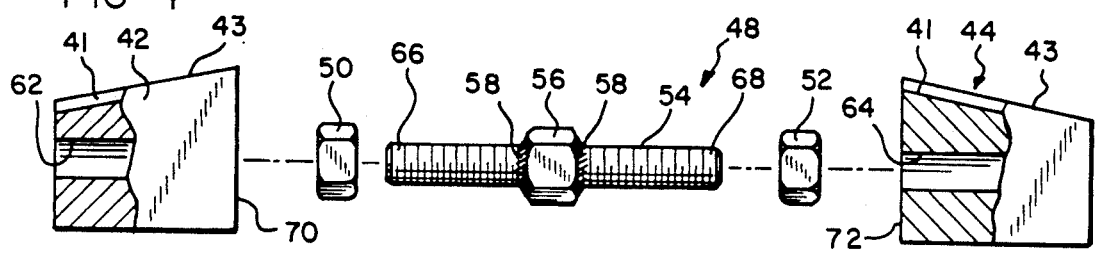
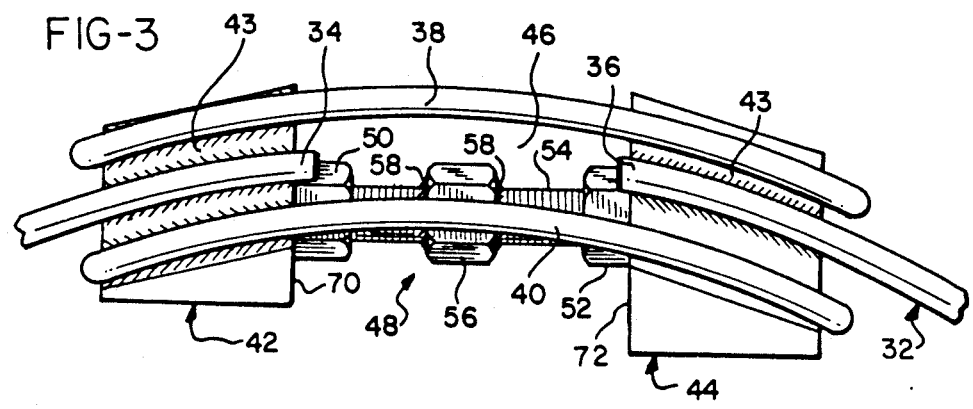

OPEN BOTTOM PIT SEAL

BACKGROUND OF THE INVENTION

1. Field of the Invention

The present invention relates to a sealing means for a subsurface chamber for establishing a liquid tight seal against an inner cylindrical surface of a wall of the chamber.

2. Description of the Prior Art

Aircraft docking areas at many air terminals are often provided with subsurface aircraft servicing pits located beneath the tarmac across which the wheels of aircraft roll while the aircraft are on the ground. Subservice aircraft servicing pits have the distinct advantage over mobile land vehicles used to service aircraft in that subsurface aircraft servicing pits do not provide obstacles to docking and departing aircraft and do not interfere with the maneuvering of aircraft in docking and refueling areas.

Conventional subsurface aircraft servicing pits are frequently formed as prefabricated fiberglass enclosures having hinged aluminum or steel access doors and hatches to allow access from above. The access doors are located flush with the surface of the aircraft loading and refueling aprons. Fuel pipes, electrical lines and conduits for supplying heated and cooled air emanate from central supply sources within an air terminal and extend underground beneath the aircraft loading and refueling aprons and into subsurface aircraft servicing pits, often through the bottom of a pit. The pit is often formed with a cylindrical interior wall surface, and is positioned so that the cylindrical wall surface surrounds a riser pipe which extends up into the pit through an open bottom therein.

When fuel pipes or other supply lines are brought into subsurface aircraft servicing pits they are terminated at valves or hydrants within the pits. Since aircraft fuel can be a form of toxic waste, if released into the environment, it is important to seal the bottom opening of the pit beneath the ground to prevent any spilled aircraft fuel from leaking out of the pit and into ground water. To this end, the bottoms of aircraft servicing pits are conventionally lined with moisture or ground seals that extend from the walls of the pit to the outer surfaces of the pipes and ducts which enter through openings through the floor of the pit and which terminate within the pit. Often fuel is brought into the pit by a single, vertically oriented riser pipe that branches from a lateral pipe line and extends vertically upwardly through the open bottom of an aircraft servicing pit.

Because the bottom of the pit is open, it is necessary to provide a seal that extends across the annular space between the outer cylindrical convex surface of a conventional riser pipe and the inner cylindrical concave surface of the pit wall. To provide a moisture proof seal to prevent fuel from leaking through the bottom of the pit, an annular expanse of a moisture impervious material, such as Buna-N rubber is spread across the bottom of the pit and is sealed to both the cylindrical outer surface of the riser pipe and the cylindrical inner surface of the pit wall. However, while reliable ground seals can be established to attach the inner peripheral margin of the sealing boot against the outer convex surface of a riser pipe, attempts to seal the outer peripheral margin of the boot against the concave interior cylindrical surface of the pit wall have proven unsatisfactory. The seals attempted have not been reliable, and liquid can leak past such conventional seals through the interface between the outer peripheral margin of the boot and the concave cylindrical surface of the pit wall.

One approach to a solution of this problem has been to form the bottom of the pit with an annular floor which terminates interiorally of the outer, concave cylindrical wall in an upwardly projecting lip. This upwardly projecting lip is configured into a cylindrical collar disposed about a riser pipe at a sufficient distance therefrom to provide adequate clearance between the riser pipe and the annular lip defining the collar formed in the floor of the pit. A seal can then be established using conventional cinch-type compression band clamps to establish liquid seals between a boot and the outer cylindrical convex surface of the riser pipe and between the boot and the outer convex cylindrical surface of the lip surrounding the opening in the floor of the pit into which the riser pipe projects. One such sealing system is described in U.S. Pat. No. 4,850,389, issued July 25, 1989.

A pit constructed to provide a convex surface against which a conventional cinch-type compression band clamp bears to clamp a rubber boot into position is not an open bottom pit in the true sense of the term. To the contrary, the bottom is to a large extent closed by the annular floor defined therein. Such a pit construction increases the cost of fabrication of the pit significantly, as contrasted with the cost of fabricating a simple, cylindrical open bottom pit. Moreover, the cost of installation of a pit having a floor with a central opening therein likewise increases significantly, since the central opening in the floor of the pit affords far less clearance about the riser pipe than the much larger diameter of the cylindrical wall of an open bottom pit. It is therefore considerably more difficult to lower the pit precisely into position such that the riser pipe projects upwardly through the relatively small opening in the center of the floor of the pit.

Nevertheless, such floored pit constructions have been adopted to a large extent to establish reliable, liquid tight seals between the structure of the pit and a riser pipe located therewithin.

SUMMARY OF THE INVENTION

One object of the present invention is to provide a means for sealing the bottom of an open bottom pit without requiring a pair of convex, interiorally located bearing surfaces against which conventional cinch-type clamping bands are compressed radially inwardly against a liquid impervious sealing material or boot. The conventional practice of requiring convex bearing surfaces in the floors of aircraft servicing pits necessarily requires reduction in the open area of the pit bottom. This reduction in open area of the bottom increases both the cost of fabricating the pit, and the difficulty of installing it in position. Furthermore, the reduction in area of the bottom of the pit is necessarily quite substantial, since an annular space of considerable width must be defined between the concave inner cylindrical surface of the pit wall and the convex cylindrical surface of the collar extending upwardly from the floor of the pit due to the necessity for providing sufficient room to manipulate the tools necessary to secure conventional cinch-type band clamps in position.

A further object of the invention is to significantly reduce both the expense and difficulty of prefabricating an open bottom pit. According to the invention, the lower extremity of the pit can be formed with a simple cylindrical wall that allows access to the interior of the pit during fabrication through the entire bottom area within that wall. Prefabricated pits formed with open bottoms can thus be laid up in resin impregnated fiberglass and simply lifted from a form when cured. The invention reduces any requirement for a radially inwardly turned partial floor at the bottom of a pit, and an axially upwardly projecting, interiorally located bearing collar extending therefrom. The simplicity of the resultant pit structure greatly reduces the cost of fabricating such pits.

In one broad aspect the present invention may be defined as a sealing device for a subsurface chamber having a wall defining and inner cylindrical surface and an open bottom. The sealing device is comprised of an expanse of flexible, liquid impervious material disposed across the open bottom and defining an annular peripheral margin, and clamping means including an expandable hoop for securement against the entire circumference of the outer margin to compress the outer margin radially outwardly against the inner cylindrical surface of the chamber to establish a liquid tight seal throughout the circumference thereof. Unlike prior sealing systems which have been employed, the sealing device of the present invention provides a means for establishing a liquid tight seal by pressure exerted radially outwardly to press against the outer peripheral margin of the flexible boot against the concave wall of the chamber, in contrast to conventional compression band clamps which only exert compressive forces in a radially inward direction.

The invention may also be considered to be an improved seal for an open bottom pit adapted for installation beneath a surface to service aircraft. The improved seal is comprised of an annular collar constructed of flexible, liquid impervious material and adapted to extend between an inner, cylindrical surface of the open bottom pit and a riser pipe encompassed therewithin. The flexible, liquid impervious material collar has inner and outer peripheral margins. The seal is also comprised of an inner band clamp means for compressing the inner peripheral margin of the collar radially inwardly against the riser pipe to establish a moisture tight seal of the inner margin about the circumference of the riser pipe. The improved seal also includes an outer clamp means for compressing the outer peripheral margin of the collar radially outwardly against the concave cylindrical wall surface of the open bottom pit to establish a moisture tight seal of the outer margin about the entire circumference of the inner cylindrical wall. The inner band clamp means thereby presses the collar, or boot, radially inwardly against the riser pipe, while the outer clamp means presses the collar or boot radially outwardly against the concave, cylindrical, open bottom pit wall surface.

Preferably, the inner band clamp means is a conventional cinch-type band clamp constructed of a band of stainless steel metal formed into a noose which is tightened by a conventional clamp that is secured to one end of the metal band which has a knurled, worm-type element engageable in transverse slots in the metal band. The outer clamp means, on the other hand, is preferably comprised of an elongated length of metal stock such as wire formed into a loop having opposite ends juxtaposed in proximity to each other, but separated from each other slightly. A loop extension means is provided on one of the ends of the loop and defines a gap therewithin to receive the other end of the loop in longitudinal overlapping relationship therewith. In this manner the length of metal stock together with the loop extension means forms a complete closed hoop with the ends of the loop in longitudinal alignment in spaced separation from each other. A means, such as an expansion device, is attached to the ends of the loop for selectively varying the distance of longitudinal separation between the ends of the loop to thereby allow selective adjustment of the circumference of the closed hoop.

The loop extension means is preferably comprised of a pair of metal wire segments secured on opposite sides of the elongated length of metal stock at one of the ends of the loop so as to receive the other end of the loop therebetween. The metal segments may be attached directly to the end of the metal stock, but preferably are attached by welding to a metal lug to which the end of the loop is also welded. Another metal lug is attached to the other end of the loop of metal stock so that the loop extension means is comprised of a pair of lugs each secured to a different end of the loop. Each of the lugs defines an opening therethrough, wherein the openings are coaxially aligned with each other. The expansion means is further comprised of separate interiorally threaded engagement means, such as hexagonal bearing nuts, that are located between the openings in the lugs. These bearing nuts are coaxially aligned with the openings in the lugs and with each other. An externally threaded stud having opposite ends is also provided and is threadably engaged with both of the interiorally threaded bearing nuts to hold them in contact with the lugs and to hold the lugs in spaced separation from each other.

Rotation of the interiorally threaded bearing nuts on the stud in advancement toward each other along the stud diminishes the circumference of the hoop, while rotation of the interiorally threaded bearing nuts on the stud in advancement apart from each other pushes the lugs apart, thereby expanding the circumference of the hoop. To provide leverage to hold the stud immobile while the bearing nuts are rotated for advancement therealong, the stud is preferably provided with another nut that is permanently and immovably secured on the stud, as by welding, intermediate the opposite ends of the stud.

The invention may be described with greater clarity and particularity with reference to the accompanying drawings.

DESCRIPTION OF THE DRAWINGS

FIG. 1 is a top plan view of a prefabricated open bottom pit for servicing an aircraft employing the open bottom pit seal of the invention.

FIG. 3 is an enlarged perspective detail of the outer clamp portion of the sealing system depicted in FIG. 1 as viewed looking radially inwardly and upwardly from within the concave cylindrical wall of the pit.

FIG. 4 is an exploded plan view, partially broken away in section, of the expansion means depicted in FIG. 3.

DESCRIPTION OF THE EMBODIMENT

Figure 2:
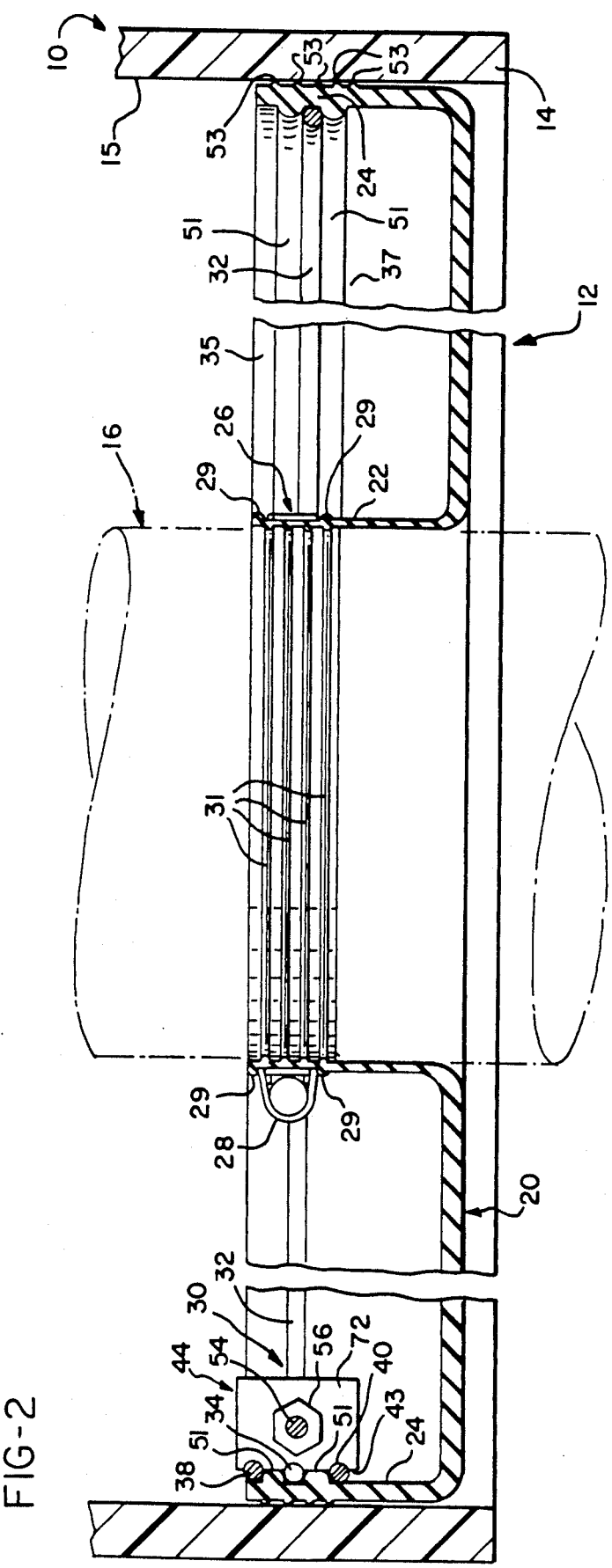
FIG. 2 is a sectional elevational detail of the bottom of the pit taken along the lines 2—2 of FIG. 1.

FIG. 1 illustrates generally a prefabricated pit 10 for servicing an aircraft. The pit 10 is formed with an open bottom, indicated generally at 12 in FIG. 2, and has an inner cylindrical wall 14 having a concave cylindrical inner surface 15 for surrounding a riser pipe 16 therewithin. The riser pipe 16 is illustrated in phantom FIG. 2 and is typically a vertically oriented steel fuel pipe riser formed in a cylindrical configuration and having a cylindrical, convex outer surface. The riser pipe 16 extends upwardly from a buried, laterally extending fuel supply pipe (not shown) and may be terminated by a transverse capping plate 18, visible in FIG. 1.

The body of the prefabricated open bottom pit 10 is formed of resin impregnated fiberglass. The inner cylindrical wall 14 is fabricated by laying up resin impregnated fiberglass about a cylindrical form. As illustrated in FIG. 2, the entire bottom 12 of the pit 10 is open across the circular expanse within the inner cylindrical wall 14.

To prevent the passage of spilled fuel or other contaminants from the prefabricated pit 10 down into the soil therebeneath, the pit 10 is provided with an annular expanse of flexible liquid impervious material forming a boot 20. The boot 20 is fabricated from Buna-N rubber and is configured generally in the shape of the lower half of a horizontally disposed torus. The boot 20 has an inner peripheral margin 22 and an outer peripheral margin 24.

The moisture sealing system of the invention is provided with an inner band clamping means indicated generally at 26 in FIG. 1, which is adapted for securement about the entire circumference of the inner margin 22 of the boot 20 to compress the inner margin 22 radially inwardly to establish a liquid tight seal throughout with the riser pipe 16 located therewithin. The fastening mechanism 28 of the inner band clamping means 26 is a conventional cinch-type fastener which includes a body secured to one end of an elongated metal band 27 and in which a threaded worm-type element is captured. The threads of the worm-type element are engagable with transverse slots defined in the structure of the band, so that rotation of the worm-type element in one direction increases the extent of overlap of the ends of the band to thereby form a noose that compresses the inner peripheral margin 22 of the sealing boot 20 radially against the outwardly facing convex surface of the riser pipe 16 until a liquid tight seal is established.

The metal band 27 is guided in position to encircle the inner peripheral margin 22 of the boot 20 by a pair of spaced clamp locator ribs 29 that protrude radially outwardly from the exposed side of the inner peripheral margin 22, as depicted in FIG. 2. Sealing of the inner margin 22 of the boot 20 is enhanced by a plurality of chevron-shaped sealing ribs 31 on the underside of the inner peripheral margin 22 of the boot 20. The annular chevron ribs 31 reside in contact with the convex cylindrical outer surface of the riser pipe 16.

The prefabricated pit 10 is also provided with an outer clamping means indicated generally at 30 for securement about the entire circumference of the outer margin 24 of the boot 20 to compress the outer peripheral margin 24 radially outwardly to establish a liquid tight seal throughout with the concave surface 15 of the inner cylindrical wall 14 of the prefabricated pit 10. The outer clamping means 30 is comprised of an elongated length of stainless steel wire 32 this is one quarter of an inch in diameter and which is formed into a loop 32 having opposite ends 34 and 36 residing proximate to each other, but with a spaced separation therebetween, as illustrated in FIG. 3.

A loop extension means is provided in the form of a pair of stainless steel wire segments 38 and 40, both one quarter inch in diameter. The wire segments 38 and 40 are both attached to the end 34 of the loop 32 by means of a metal lug 42, which is configured generally in the shape of a trapezoidal prism, as best depicted in FIG. 4. The end 34 of the loop 32 is seated in the centermost of three parallel arcuately extending channels or grooves 41 that are defined in the radially outwardly facing surface 43 of the metal lug 42. The grooves 41 are of semicircular cross section and are spaced apart across the surface 43.

The wire end 34 is welded to the lug 42 in the central groove 41 of the surface 43 of the metal lug 42. Similarly, the ends of the metal wire segments 38 and 40 are welded to the surface 43 in the grooves 41 on both sides of the wire end 34, as best depicted in FIG. 3. The free ends of the metal wire segments 38 and 40 extend across the gap that exists between the ends 34 and 36 of the loop 32. The free ends of the parallel wire segments 38 and 40 extend toward and bracket the other end 36 of the loop 32 and rest in similar grooves 41 on the surface 43 of a second trapezoidal-shaped metal lug 44. The wire segments 38 and 40 pass on opposite sides of the end 36 of the wire loop 32, which is welded to the surface 43 of the lug 44 in the central groove 41 thereon.

The pair of wire segments 38 and 40 are secured on opposite sides at the end 34 of the loop 32 so as to receive the other end 36 therebetween. The bearing lugs 42 and 44 are each secured to a different one of the opposite ends of the wire forming the loop 32. The grooves 41 on the surfaces 43 of the lugs 42 and 44 are longitudinally aligned with each other. Therefore, the wire segments 38 and 40 extend from the outer grooves 41 on the lug 42 and span the distance of separation of the lugs 42 and 44 and are received in sliding engagement with the outermost pair of grooves 41 on the lug 44. The grooves 41 ensure proper transverse spacing of the wire segments 38 and 40 from the ends 34 and 36 of wire loop 32.

The wire segments 38 and 40 straddle or bracket the wire end 36 after bridging the variable distance between the lugs 42 and 44 so that the wire end 36 resides in the gap 46 defined between the metal strips 38 and 40. The gap 46 is adapted to receive the end 36 of the loop 32 in overlapping relationship therewith. The wire segments 38 and 40, together with the wire loop 32, form a complete, closed hoop within the cylindrical wall 14 of the pit 10. Parallel annular positioning beads 51 are defined on the exposed surface of the outer peripheral margin 24 of the boot 20 to aid in properly positioning the wire forming the loop 32 as well as the wire segments 38 and 40, as illustrated in FIG. 2. The beads 51 ensure that the loop 32 assumes a horizontal disposition and a circular configuration and that the wire segments 38 and 40 also reside in horizontal planes just above and below the loop 32, respectively.

An adjustable spacing means 48 is provided to hold the end 34 and 36 of the loop 32 in longitudinal alignment and in spaced separation from each other. The adjustable spacing means 48 is coupled to the ends 34 and 36 of the loop 32 to selectively and adjustably vary the distance of separation therebetween. The adjustable spacing means 48 is depicted in detail in the exploded view of FIG. 4 and is comprised of the two metal lugs 42 and 44, a pair of internally threaded bearing nuts 50 and 52, an externally threaded stud 54, and a turning nut 56 threadably engaged at the center of stud 54 and welded thereto by welds indicated at 58.

As illustrated in FIG. 4, the metal lugs 42 and 44 are formed with cylindrical openings 62 and 64 defined respectively therethrough. When the outer band clamping means 30 is assembled, the openings 62 and 64 in the metal lugs 42 and 44 are coaxially and longitudinally aligned with each other and are of a diameter larger than the diameter of the threaded stud 54, so that the ends of the threaded stud 54 are able to move freely within the openings 62 and 64.

When the clamping means 30 is assembled, the end 66 of the stud 54 extends into the opening 62 in the lug 42, while the end 68 of the stud 54 extends into the opening 64 in the lug 44. The bearing nuts 50 and 52 are threadably engaged on the stud 54. The bearing nut 50 is located proximate to the end 66, but interiorally therefrom, while the nut 52 is located proximate the end 68, but interiorally therefrom. As illustrated in FIG. 3, the nuts 50 and 52 respectively reside in bearing abutment against the interiorally facing surfaces 70 and 72 of the lugs 42 and 44, respectively. The bearing nuts 50 and 52 thereby bear against the surfaces 70 and 72 of the structures of the lugs 42 and 44 about the longitudinal openings 62 and 64 therein.

The bearing nuts 50 and 52 are capable of advancement along the stud 54 away from each other to press the lugs 42 and 44 apart to expand the hoop formed by the metal loop 32 and the wire segments 38 and 40. The bearing nuts 50 and 52 are also capable of advancement in an opposite direction toward each other along the stud 54, inwardly from their respective proximate ends 66 and 68 thereof, to allow the hoop to contract.

The third nut 56 is rigidly immobilized on the stud 54 midway between the ends 66 and 68 thereof. This turning nut 56 provides a means for immobilizing the stud 54 from rotation while the bearing nuts 50 and 52 are advanced along the length of the stud 54.

The adjustable spacing means 48 serves as a hoop expansion means. The ends 66 and 68 of the stud 54 project into the openings 62 and 64 in the bearing lugs 42 and 44, respectively. The bearing nuts 50 and 52 serve as means for bearing against the surfaces 70 and 72 of the bearing nuts 42 and 44 to force the lugs 42 and 44 away from each other to thereby increase the distance of separation between the ends 34 and 36 of the wire forming the loop 32 and to expand the circumference of the hoop formed thereby.

To deploy the improved sealing system for the open bottom pit 10, the pit 10 is first lowered into position in an excavation beneath a surface designed to service aircraft. The pit is lowered concentrically about the fuel line riser 16 so that the concave interior surface 15 of the cylindrical wall 14 resides in generally coaxial alignment about the pipe riser 16. Once installation of the pit 10 has been completed and the excavation outside the cylindrical wall 14 has been filled, the improved sealing system of the invention can be installed.

The annular boot 20 is lowered into position about the fuel riser pipe 16 with the inner peripheral margin 22 of the boot 20 residing loosely against the outer convex cylindrical wall of the riser 16, and with the outer peripheral margin 24 of the boot 20 residing loosely in contact with the inner concave cylindrical surface 15 of the cylindrical wall 14 of the prefabricated pit 10.

The inner conventional cinch-type band clamp means 26 is first installed by positioning the inner metal band thereof in encircling fashion about the inner peripheral margin 22 so that the inner peripheral margin 22 is sandwiched between the inner metal band and the outwardly facing convex cylindrical wall of the fuel riser pipe 16. The fastener 28 is then tightened in a conventional manner to establish a liquid tight seal between the inner peripheral margin 22 of the boot 20 and the outer surface of the riser 16.

The outer clamp system 30 is then installed. The bearing nuts 50 and 52 are first advanced toward the third nut 56 on the stud 54 by rotation in opposite directions. The stud 54 is threaded in the normal, right-hand configuration, so that the nut 50 is advanced to the right and the nut 52 advanced to the left, as viewed in FIG. 4, by rotation in opposite directions. The outer band clamp means 30 is then lowered into the pit 10 so that the elongated length of wire forming the loop 32 resides in horizontal alignment and within the channel defined between the pair of circular beads 5 that extend about the entire circumference of the outer peripheral margin 24 of the boot 20. The loop 32 is then manually spread to force the ends 34 and 36 thereof as far apart as possible radially outwardly against the surface of the channel between the beads 51 in the outer peripheral margin 24 of the boot 20. The bearing nuts 50 and 52 are then manually advanced respectively toward the ends 66 and 68 and away from each other until they bear against the surfaces 70 and 72 of the lugs 42 and 44, respectively.

The third or turning nut 56 that is welded to the stud 54 is then held immobile with a wrench to prevent the stud 54 from turning. The bearing nuts 50 and 52 are turned with another wrench to advance them toward the extremities of their respective ends 66 and 68 and away from each other to force the lugs 42 and 44 away from each other to thereby increase the distance of separation between the ends 34 and 36 of the loop 32. The metal strips 38 and 40 are long enough so that they always overlap and embrace the end 36 of the loop 32, thereby ensuring a fully enclosed hoop at all times.

The stud 54 is long enough so that the extremities of the ends 66 and 68 will always extend, respectively, into the openings 62 and 64 even when the lugs 42 and 44 are pushed far apart. This ensure that the stud 54 cannot slide laterally relative to either the lug 42 or the lug 44. Advancement of the bearing nuts 50 and 52 outwardly along the stud 54 away from each other increases the distance of separation of the ends 34 and 36 of the loop 32 and expands the circumference of the hoop until the outer peripheral margin 24 of the boot 20 is pressed radially outwardly against the concave inner surface 15 of the cylindrical wall 14 to establish a liquid tight seal therewith. The annular chevron-shaped ribs 53 on the underside of the outer peripheral margin 24 aid in establishing and maintaining a liquid tight seal. Installation of the sealing device of the invention is thereupon complete.

Undoubtedly, numerous variations and modifications of the invention will become readily apparent to those familiar with the manufacture and installation of subsurface chambers. For example, different types of adjustable spacing devices may be employed in place of that depicted at 48 in the drawings. Accordingly, the scope of the invention should not be construed as limited to the specific embodiment depicted and described herein, but rather is defined in the claims appended hereto.

I claim:

1. A sealing device for a subsurface chamber having a wall defining an inner cylindrical surface and an open bottom comprising: an expanse of flexible, liquid impervious material disposed across said open bottom and defining an outer annular peripheral margin which establishes a continuous, unbroken annular band of contact with said inner cylindrical wall surface, and clamping means including an expandable hoop comprised of an elongated length of metal wire having opposite ends juxtaposed in proximity to each other and formed into a loop having an opening between said opposite ends, a pair of bearing lugs each of which is secured to a different one of said opposite ends of said elongated length of wire and each of which includes longitudinal openings in coaxial alignment with each other, interiorally threaded engagement means located at each of said longitudinal openings, a pair of metal wire segments each of which is secured to one and no more than one of said lugs wherein said wire segments reside in contact with said unbroken annular band on opposite sides of said opposite ends of said elongated length of wire and in longitudinally overlapping fashion therewith to thereby span said opening between said opposite ends to form a completely enclosed hoop, and an externally threaded stud having ends which project into said longitudinal openings in said bearing lugs and wherein said externally threaded stud is threadably engaged in both of said interiorally threaded engagement means at said longitudinal openings such that relative rotation between said externally threaded stud and said interiorally threaded engagement means in one direction presses said lugs apart to expand said hoop and relative rotation between said externally threaded stud and said interiorally threaded engagement means in an opposite direction allows said hoop to contract.

2. A sealing device according to claim 1 further characterized in that said interiorally threaded engagement means are comprised of a pair of bearing nuts threadably engaged on said externally threaded stud proximate said ends thereof and said bearing nuts reside in bearing abutment against the structures of said lugs about said longitudinal openings therein, whereby said bearing nuts are movable along said studs away from each other to press said lugs apart to expand said hoop and said bearing nuts are also movable along said stud in an opposite direction toward each other to allow said hoop to contract.

3. A sealing device according to claim 2 further comprising a third nut rigidly immobilized on said stud between said ends of said stud.

4. A sealing device according to claim 1 wherein each of said lugs is formed with at least a pair of radially outwardly facing grooves therein wherein said pair of metal wire segments are fastened to a first of said lugs seated in a pair of said grooves and a corresponding pair of grooves in said other lug are longitudinally aligned with said pair of grooves in said first lug to receive said metal wire segments in sliding engagement therewith.

5. An improved seal for an open bottom pit adapted for installation beneath a surface to service aircraft comprising: an annular collar constructed of a continuous unbroken sheet of a flexible, liquid impervious material and adapted to extend between an inner, concave cylindrical wall surface of said open bottom pit and a riser pipe encompassed therewithin, said collar having inner and outer annular peripheral margins, inner band clamp means for compressing said inner peripheral margin of said collar radially inwardly against said riser pipe to establish a moisture tight seal of said inner margin about the circumference of said riser pipe, and outer clamp means for compressing said outer peripheral margin of said collar radially outwardly against said concave cylindrical wall surface of said open bottom pit to establish a moisture tight seal of said outer margin about the entire circumference of said inner cylindrical wall, said outer clamp means comprising a length of metal stock formed into a loop having opposite ends juxtaposed in proximity to each other with a gap therebetween, a pair of lugs each secured to a different one of said ends of said loop and each defining a opening therethrough and wherein said openings are coaxially aligned, a pair of metal wire segments secured on opposite sides of said elongated loop of metal stock in longitudinally overlapped relationship with said ends of said loop so that said ends of said loop both reside between said metal wire segments in said pair, separate interiorally threaded engagement means for each of said openings coaxially aligned therewith, and an externally threaded stud having opposite ends threadably engaged with both of said interiorally threaded engagement means to hold said lugs in spaced separation from each other, whereby relative rotation between said stud and said interiorally threaded engagement means in one direction advances said interioraly threaded engagement means toward each other along said stud to diminish the circumference of said hoop, while relative rotation between said stud and said interiorly threaded engagement means in the opposite direction advances said interiorly threaded engagement means apart from each other and pushes said lugs apart, thereby expanding the circumference of said hoop.

6. A seal according to claim 5 further comprising a nut permanently and immovably secured on said stud intermediate said opposite ends of said stud.

7. In a prefabricated pit for servicing an aircraft and formed with an open bottom and an inner cylindrical wall for surrounding a riser pipe therewithin, the improvement comprising: an annular unbroken expanse of flexible, liquid impervious material having inner and outer peripheral margins, an inner band clamping means for securement about the entire circumference of said inner margin to compress said inner margin radially inwardly to establish a liquid tight seal throughout with a riser pipe located therewithin, and an outer clamping means for securement about the entire circumference of said outer margin to compress said outer margin radially outwardly to establish a liquid tight seal throughout with said inner cylindrical wall, wherein said outer clamping means is comprised of a length of metal stock formed into a loop having opposite ends juxtaposed in proximity to each other with a gap therebetween, a pair of lugs each secured to a different end of said loop and each defining a opening therethrough and wherein said openings are coaxially aligned with each other, a pair of metal wire segments disposed on opposite sides of said elongated length of metal stock and extending between said lugs and residing in contact with said outer peripheral margin of said liquid impervious material on opposite sides of said elongated length of metal stock so as to longitudinally overlap both of said ends of said loop, interiorally threaded engagement means for each of said openings in said lugs, and an externally threaded stud having opposite ends threadably engaged with both of said interiorally threaded engagement means to hold said interiorally threaded engagement means in spaced separation from each other, whereby relative rotation between said stud and said interiorally threaded engagement means in one direction permits the circumference of said hoop to diminish, while relative rotation between said stud and said interiorally threaded engagement means in an opposite direction pushes said lugs apart, thereby expanding the circumference of said hoop.

* * * * *